Feb. 4, 1958 E. BUHLER 2,822,129
TYPEWRITER ACCUMULATOR
Filed Nov. 30, 1954 12 Sheets-Sheet 2

INVENTOR.
EUGEN BUHLER
BY Joe L. Koester
ATTORNEY

Feb. 4, 1958     E. BUHLER     2,822,129
TYPEWRITER ACCUMULATOR
Filed Nov. 30, 1954     12 Sheets-Sheet 3
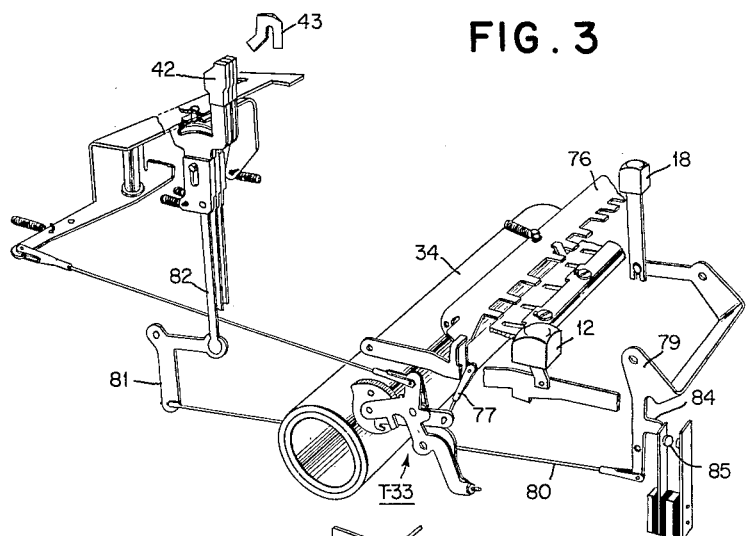
FIG. 3
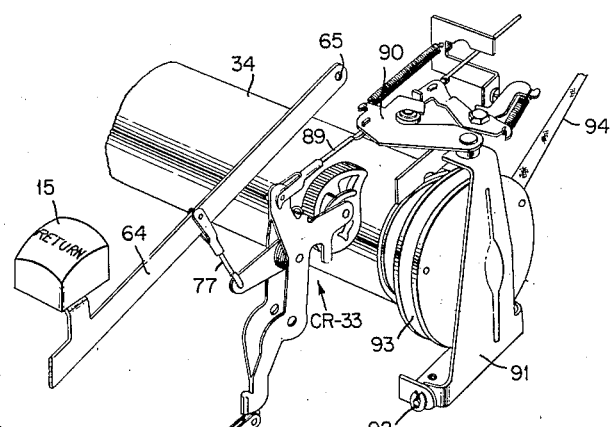
FIG. 4
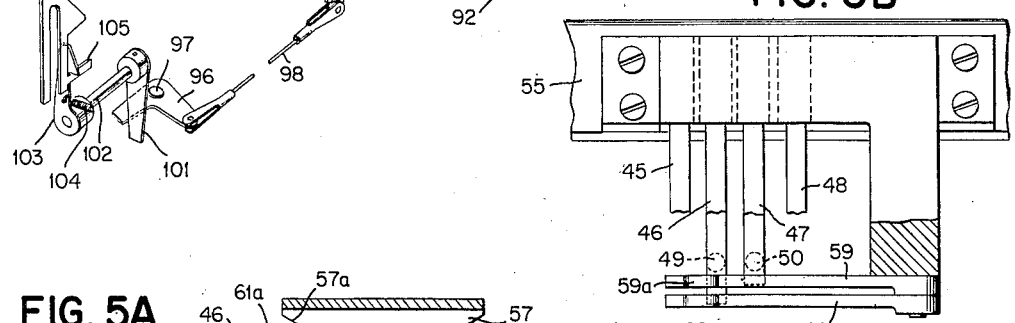
FIG. 5B
FIG. 5A
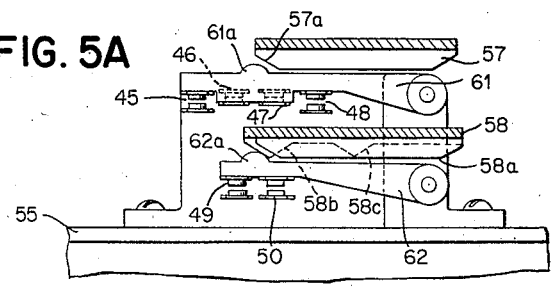
*INVENTOR.*
EUGEN BUHLER
BY Joe L. Koerber
ATTORNEY Feb. 4, 1958

E. BUHLER 2,822,129

TYPEWRITER ACCUMULATOR

Filed Nov. 30, 1954

INVENTOR.
EUGEN BUHLER

BY *Joe L. Koerber*

ATTORNEY

Feb. 4, 1958     E. BUHLER     2,822,129
TYPEWRITER ACCUMULATOR
Filed Nov. 30, 1954     12 Sheets—Sheet 5
FIG. 7
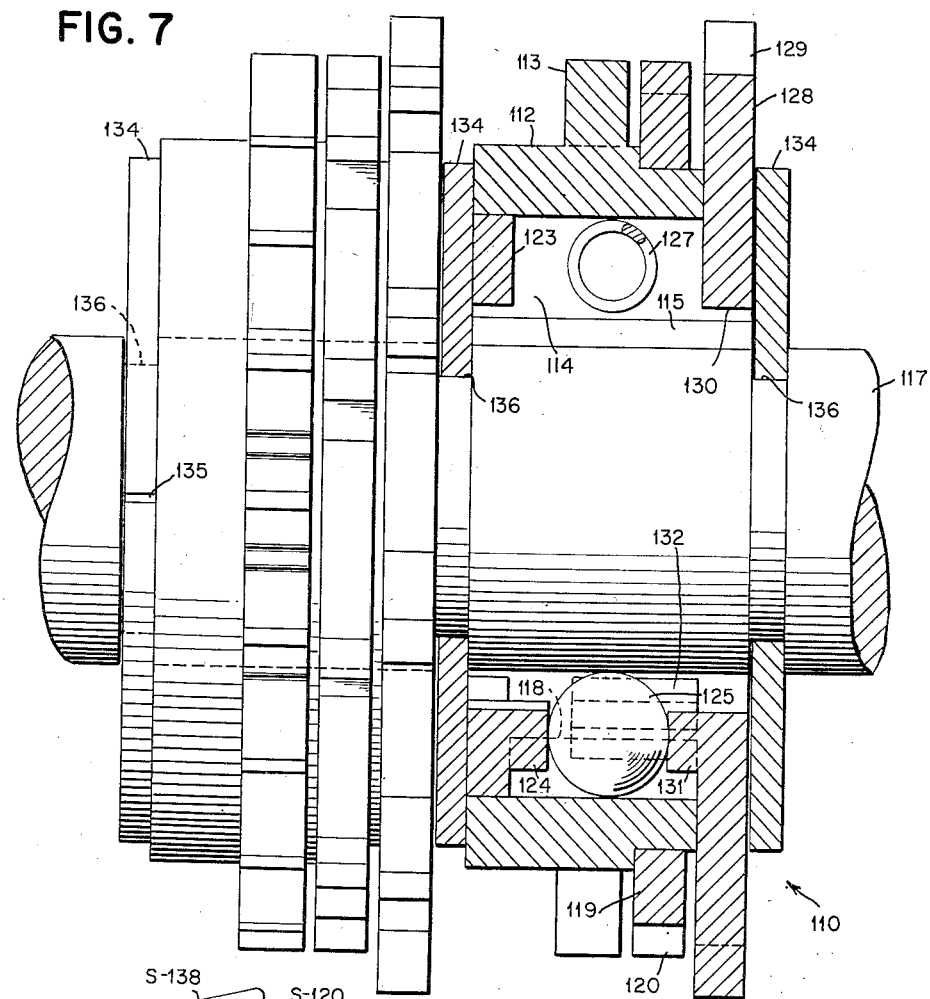
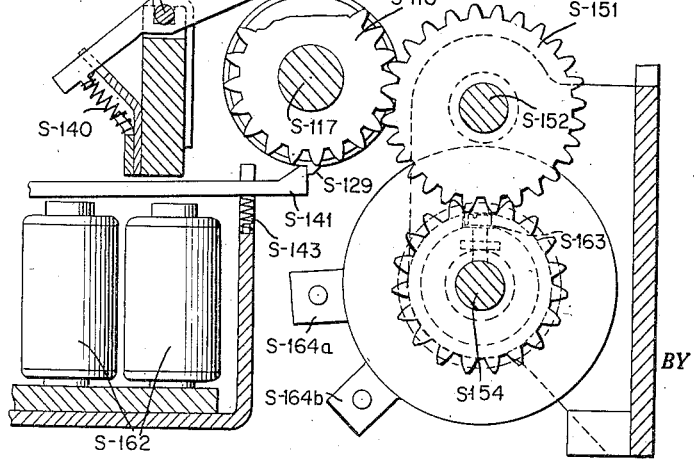
FIG. 8
INVENTOR.
EUGEN BUHLER
BY Joe L. Koerber
ATTORNEY Feb. 4, 1958     E. BUHLER     2,822,129
TYPEWRITER ACCUMULATOR
Filed Nov. 30, 1954     12 Sheets-Sheet 6

INVENTOR.
EUGEN BUHLER
BY Joe L. Koerber
ATTORNEY

Feb. 4, 1958   E. BUHLER   2,822,129
TYPEWRITER ACCUMULATOR
Filed Nov. 30, 1954   12 Sheets-Sheet 7

INVENTOR.
EUGEN BUHLER
BY Joe L. Koerber
ATTORNEY

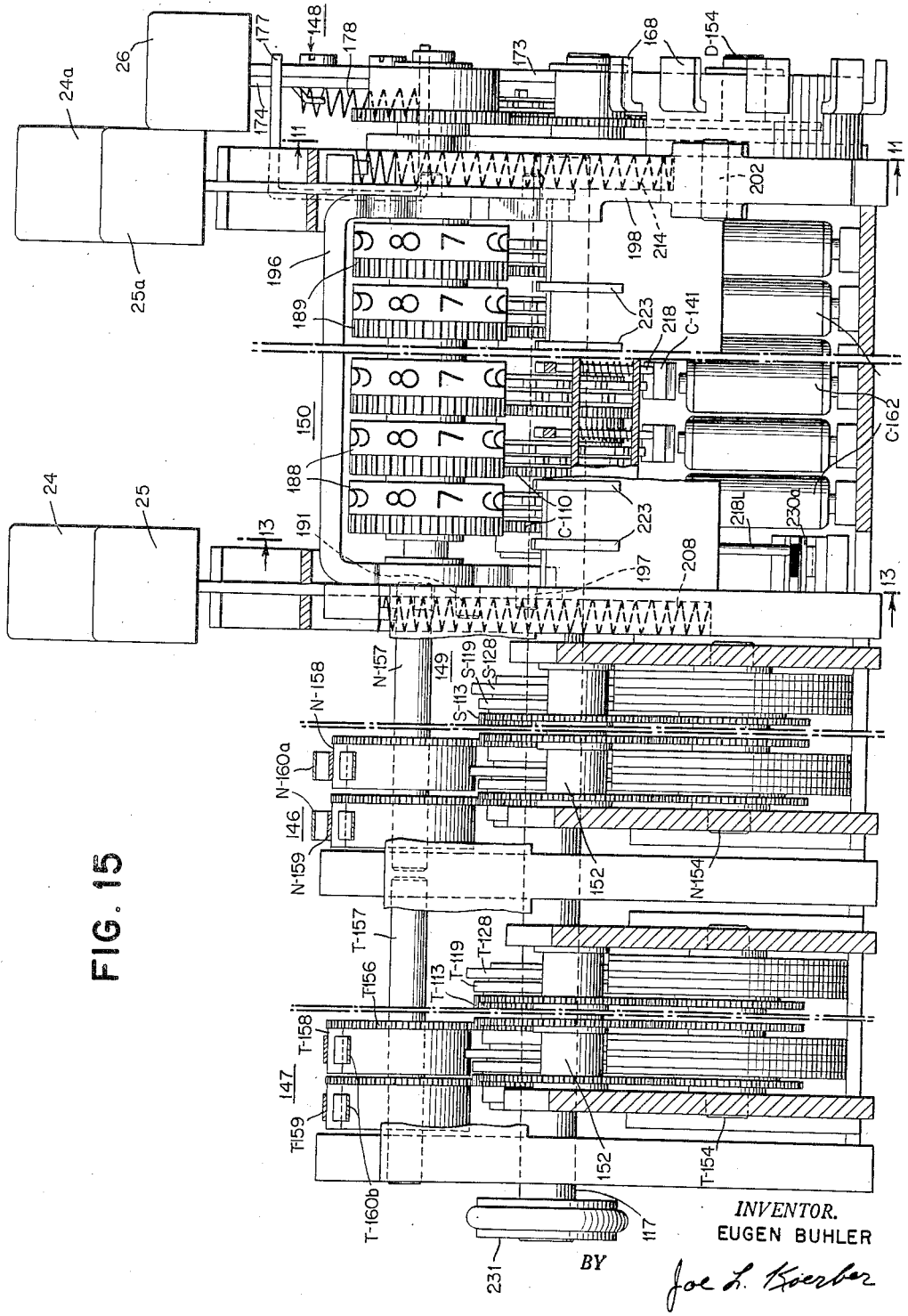

Feb. 4, 1958  E. BUHLER  2,822,129
TYPEWRITER ACCUMULATOR
Filed Nov. 30, 1954  12 Sheets-Sheet 11

FIG. 17

| DEBIT CTR. | CREDIT CTR. | TIME OF READING |
|---|---|---|
| 0,000,000.00 | 9,999,999.99 | Initial reading |
| 0,090,000.00 | 9,909,999.99 | Reading after debit entry #1 |
| 0,082,000.00 | 9,917,999.99 | Reading after credit entry #1 |
| 9,998,446.88 | 0,001,553.11 | Reading after credit entry #2 and before corrective "1" carry around |
| 9,998,446.87 | 0,001,553.12 | After corrective "1" carry around |

CLEARING COUNTER OF DEBIT BALANCE

| DEBIT CTR. | CREDIT CTR. | TIME OF READING |
|---|---|---|
| 0,008,700.13 | 9,991,299.86 | Counter readings before typing balance |
| 0,000,000.00 | 9,999,999.99 | Counter readings after typing balance |

CLEARING COUNTER OF CREDIT BALANCE

| DEBIT CTR. | CREDIT CTR. | TIME OF READING |
|---|---|---|
| 9,991,299.86 | 0,008,700.13 | Counter readings before typing balance |
| 9,999,999.99 | 0,000,000.00 | Counter readings after total typing and before corrective "1" carry around |
| 0,000,000.00 | 9,999,999.99 | After corrective "1" carry around |

| ITEMS | DEBIT | CREDIT |
|---|---|---|
| DEBIT #1 | 90,000.00 | |
| CREDIT #1 | | 8000.00 |
| CREDIT #2 | | 83553.12 |
| BALANCE | 8700.13 | |
| BALANCE | | 8700.13 |

INVENTOR.
EUGEN BUHLER
BY Joe L. Koerber
ATTORNEY

Feb. 4, 1958  E. BUHLER  2,822,129
TYPEWRITER ACCUMULATOR
Filed Nov. 30, 1954  12 Sheets-Sheet 12
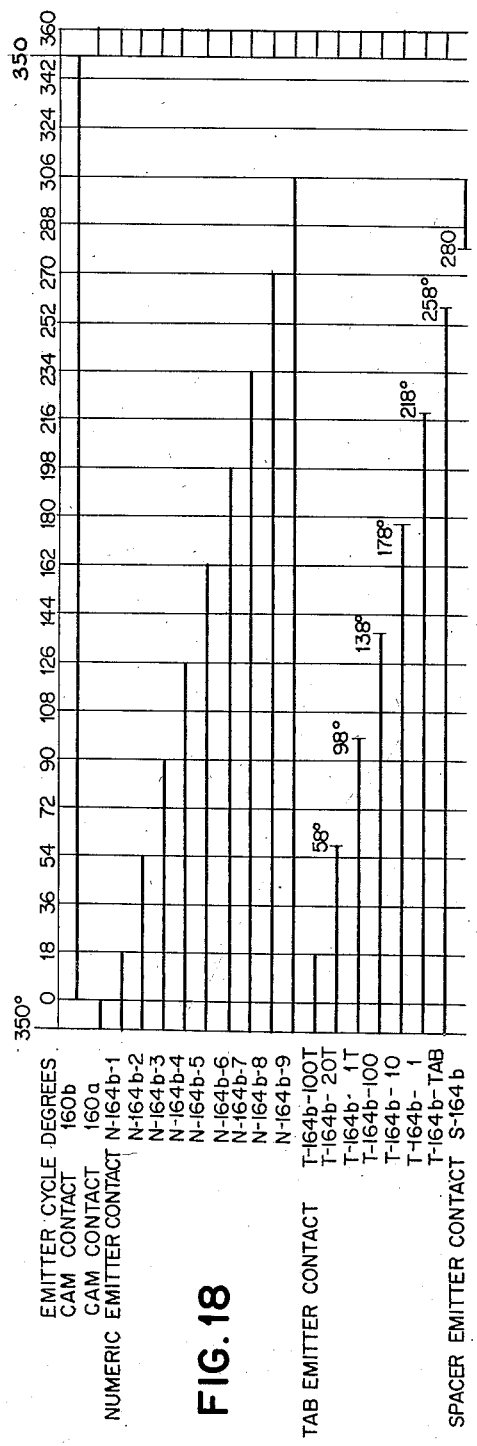
FIG. 18
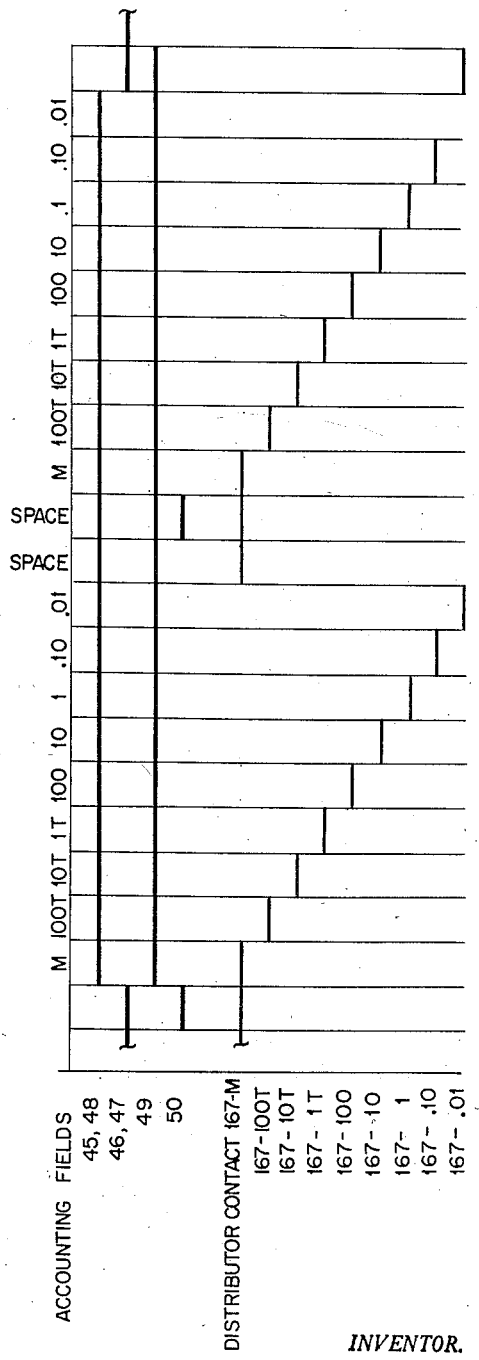
INVENTOR.
EUGEN BUHLER
BY Joe L. Koerber
ATTORNEY United States Patent Office 2,822,129
Patented Feb. 4, 1958

2,822,129

TYPEWRITER ACCUMULATOR

Eugen Buhler, Poughkeepsie, N. Y., assignor to International Business Machines Corporation, New York, N. Y., a corporation of New York Application November 30, 1954, Serial No. 472,046

11 Claims. (Cl. 235—59)

This invention relates to an accumulator and more particularly to an accumulator that is built into a typewriter as an integral part thereof.

Accumulators have heretofore been combined with typewriters to accumulate the amounts typed, but have generally been objectionably bulky and complex, often times comprising separate machines having an external connection with the typewriter. The present invention eliminates the need for separate typing and accumulating machines and provides a small, light and relatively simple combination typewriter-accumulator in a single machine cover that is not appreciably larger than the usual typewriter cover and does not interfere with the normal machine operation.

It is an object of this invention to provide a compact combination typewriter-accumulator.

Another object of the invention is to provide a typewriter-accumulator that has a visual indication of the accumulated amount.

Still another object of the invention is to provide a typewriter-accumulator that differentiates credit and debit totals.

Yet another object of the invention is to provide an accumulator that accumulates typed values and is cleared to zero when the total is typed.

Other objects of the invention will be pointed out in the following description and claims and illustrated in the accompanying drawings, which disclose, by way of example, the principle of the invention and the best mode, which has been contemplated, of applying that principle.

In the drawings:

Fig. 3 is a perspective partial view of the decimal tabulation mechanism.

Fig. 4 is a perspective partial view of the carriage return mechanism.

Fig. 5A is a view taken along a line 5—5 in Fig. 2 and shows carriage operated contacts.

Fig. 5B is a top view of the contacts shown in Fig. 5A.

Fig. 7 is a front view of a pair of clutches, one in full and one in section.

Fig. 8 is a side view of a column distributor spacer.

Fig. 15 is a broken front elevation of the accumulator.

Figure 16A:
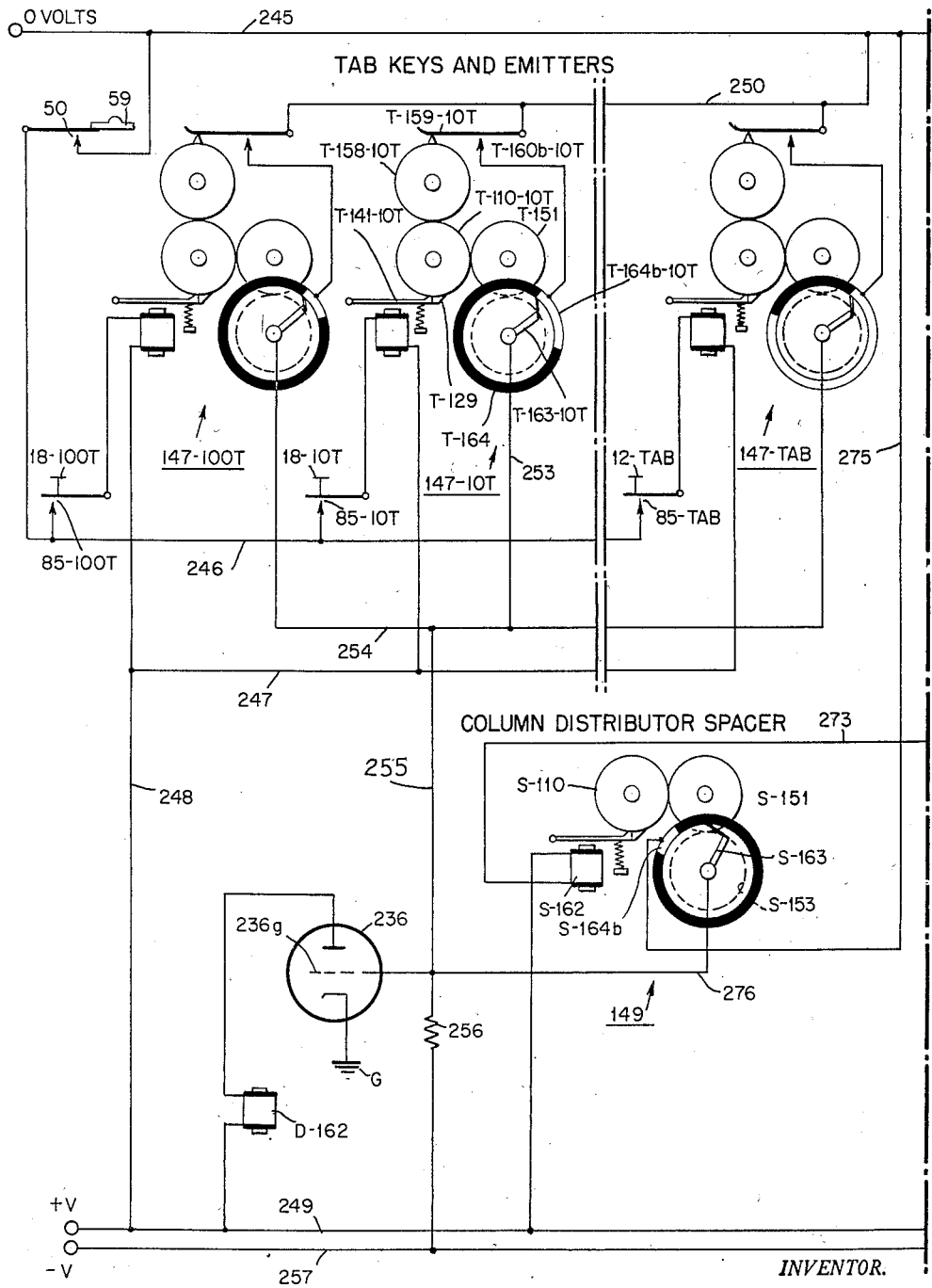
Figure 16B:
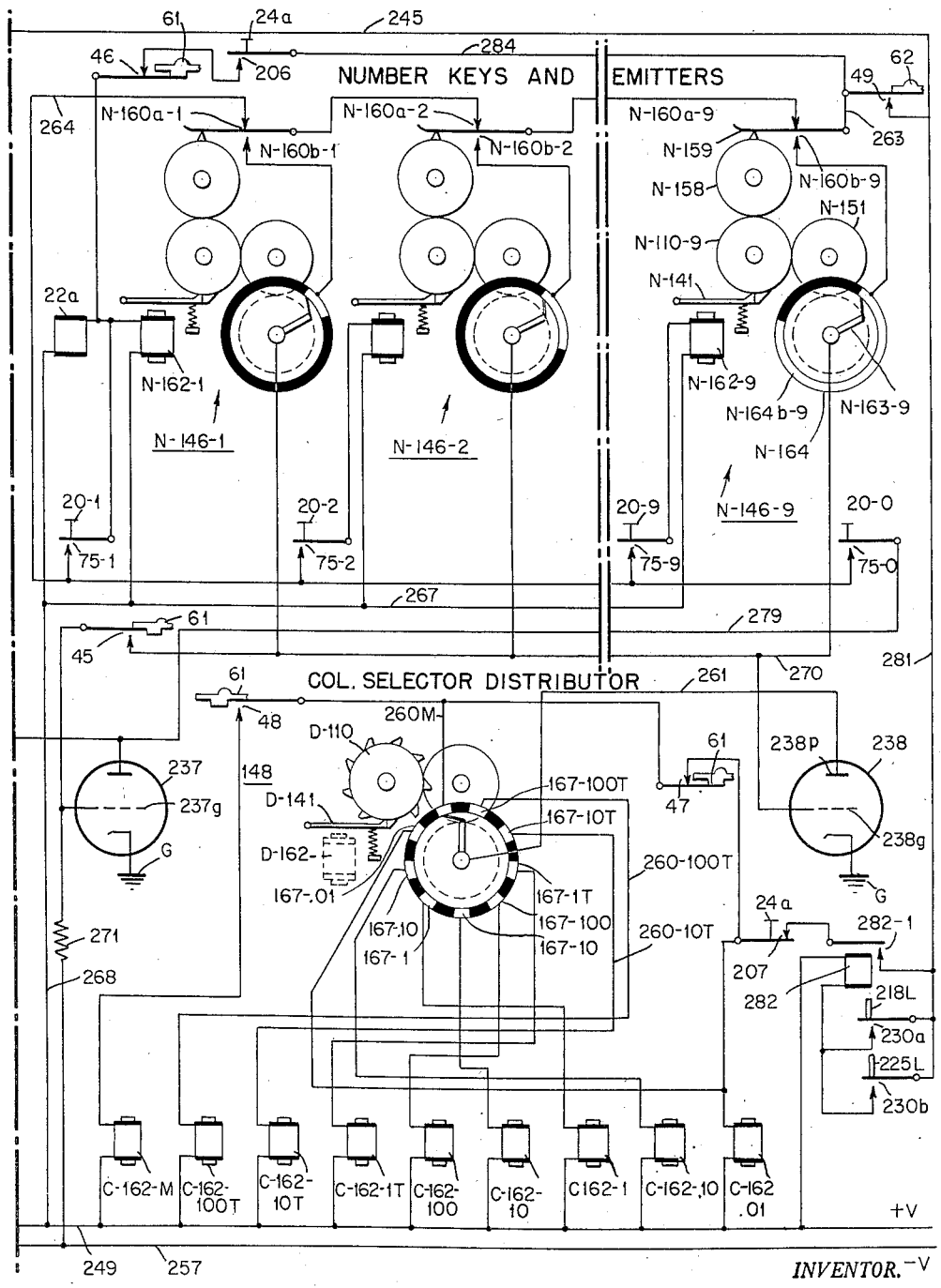

Figs. 16A and 16B comprise a wiring diagram for the accumulator.

Fig. 17 is a view of the type of statement to be prepared with the typewriter-accumulator and shows representative accumulator readings.

Fig. 18 shows two timing charts, the upper one illustrating the time duration of the digit emitters and the tabulation emitters; the lower one illustrating the relative times of operation of various contacts in the accumulator.

The invention disclosed in the drawings has been illustrated as applied to a decimal tabulating machine. The general construction and operation of the decimal tabulating machine may be understood by reference to Patents No. 1,602,757 covering the power type-bar operating mechanism; No. 1,681,267, the motor driving connections and No. 1,753,450, the automatic carriage return mechanism. Parts of the tabulating mechanism are described in Patents Nos. 1,935,436; 2,157,053 and application Serial No. 286,684, filed May 8, 1952 on behalf of Eugen Buhler, John Norcross and Ronald Dodge. As the above patents and patent application describe the machine in considerable detail and as these mechanisms are now well known in the art, only the parts directly concerned with the present invention will be described in detail.

It is to be understood that the machine illustrated as having the present invention incorporated therein operates in a manner identical to the one described in the previously referred to patent application No. 286,684. It will be understood, however, that the invention is not limited to embodiment in a typewriter of the form illustrated, but may be embodied in other typewriters upon suitable modification of the various instrumentalities thereof.

In view of the disclosure of the typewriter in the cited application and patents, it will not be described in detail herein, but only to the extent necessary to illustrate its cooperation with the accumulator.

Figure 1:
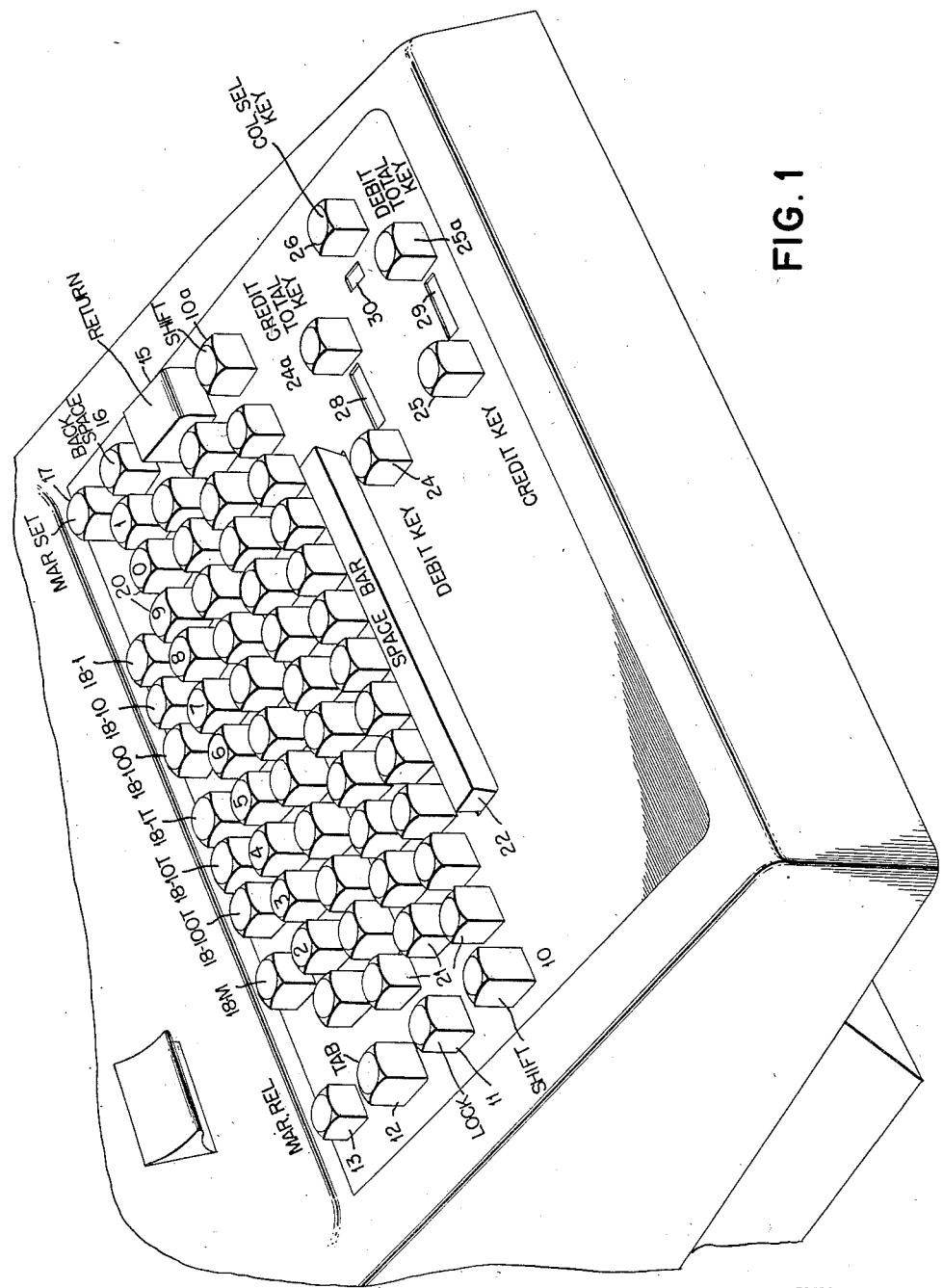
Fig. 1 shows the usual decimal tabulation keyboard and special keys for controlling the accumulator as well as viewing windows for debit and credit counters and a column indicator.

In Fig. 1 is shown the usual decimal tabulation keyboard comprising, on the left hand side from front to rear, a shift key 10, a shift lock key 11, a decimal tabulation key (TAB) 12, and a margin release key 13. On the right hand side from front to rear are shown a shift key 10a, a carriage return key 15, a back space key 16, and a margin set key 17. In the back row from left to right are seven tabulation keys 18 as follows: one million position key 18—M, one hundred thousand position key 18—100T, ten thousand position key 18—10T, one thousand position key 18—1T, one hundred position key 18—100, ten position key 18—10 and unit position key 18—1. Hereinafter where reference is made to one of a plurality of denominational orders, as in the immediately preceding sentence, such reference will be made in the foregoing manner by use of the particular part number with a suffix indicating the order.

A row of numeric keys 20 and three rows of alphabetic keys 21 are arranged in front of the tabulation keys 18 in the usual manner. A manual space bar 22 is located in the usual position with respect to the character keys 21 and has an actuating solenoid 22a, shown in Fig. 2, associated therewith for spacing in response to an electrical impulse.

In front of the space bar 22 are five keys 24, 24a, 25, 25a and 26 for controlling the accumulator, and three windows 28, 29 and 30 for viewing respectively the debit counter reading, the credit counter reading and a wheel that indicates the counter order at which the carriage is currently positioned.

Figure 2:
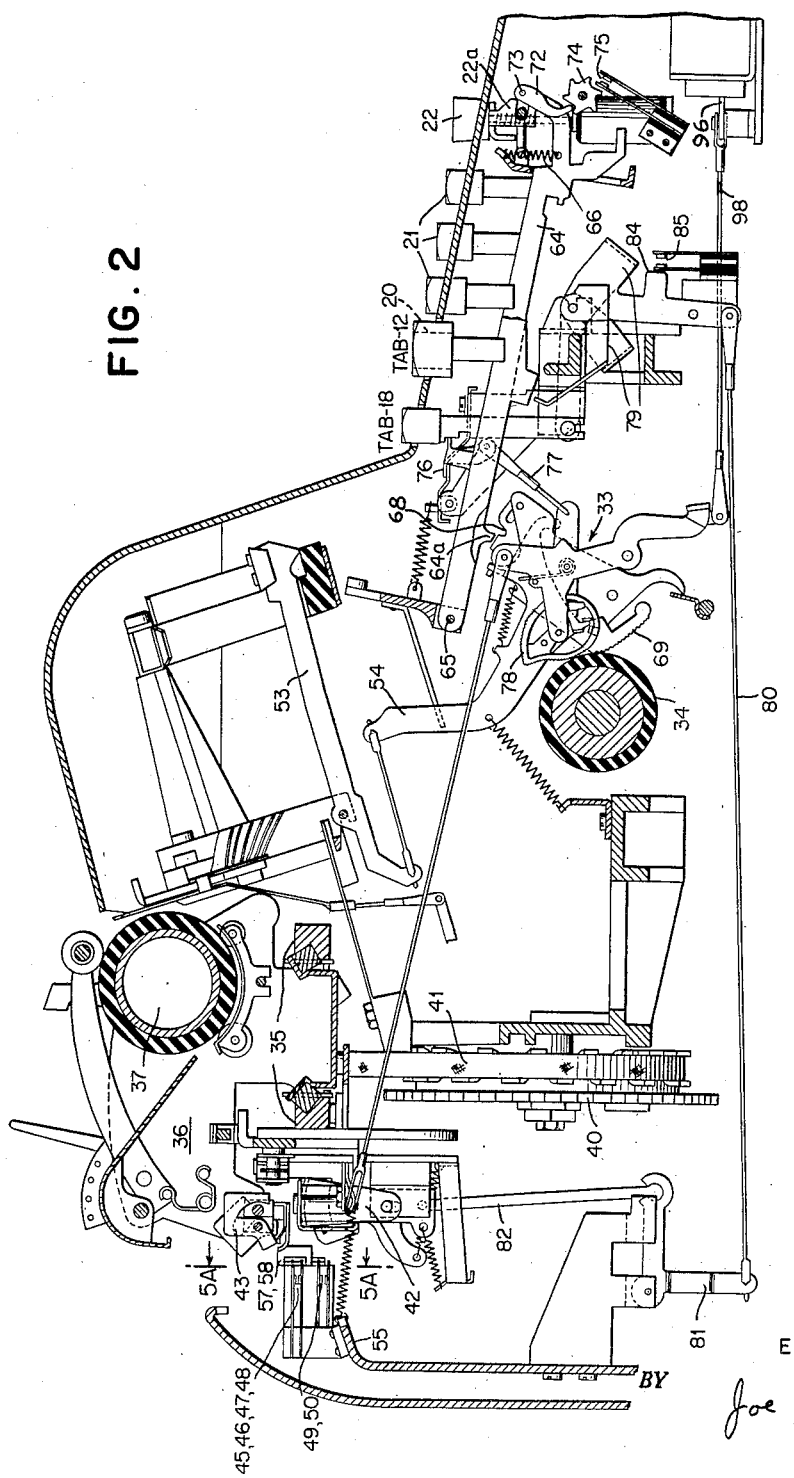
Fig. 2 is a sectional left elevation showing typewriter parts that are directly connected with the inventive features.

The sectional elevation in Fig. 2 shows the essential parts of the machine that are associated with the accumulator, the decimal tab key 12, one of the tab keys 18, one of the numeric keys 20, one key 21 of each of the three rows of alphabetic keys, the space bar 22, one of a plurality of power units 33, a power roller 34 that is driven by a motor in the now well-known manner, carriage supports 35, a carriage 36, a platen 37 mounted on the carriage in the usual manner, a carriage biasing spring motor 40, and a tape 41 connecting the spring motor and carriage, tabulation interposers 42, settable interposer stops 43, carriage operated electrical contacts 45, 46, 47, 48, 49 and 50 that are also shown in Figs. 5A and 5B, and one of a plurality of type bars 53, and sub levers 54. As shown in Figs. 2, 5A and 5B, the contacts 45—50 are mounted on a frame member 55 and are positioned to be actuated by cams 57 and 58 at times during the carriage movement that are determined by the positioning of the cams 57 and 58 on the carriage 36. As shown in Fig. 2, the cams 57 and 58 are mounted as a unit on the carriage 36 beneath the interposer stops 43. The positioning of the cams 57 and 58 depends on the desired location of the numeric fields on the typewritten sheet. A cam surface 57a of the cam 57, as shown in Fig. 5A, is adapted to operate on a cam point 61a of a pivoted lever 61 that is adapted to close the contacts 45 and 48 and to simultaneously open the contacts 46 and 47 as the carriage moves into the millions order typing position. Reference may be had to the timing chart, Fig. 18, for the relative operation times of the above mentioned contacts.

The points 45, 46, 47 and 48 are held in their actuated positions while the carriage traverses both numeric fields, and, at the completion thereof, the cam point 61a is clear of the cam 57 and, under compulsion of the spring leafs of the contacts 45—48, the contacts 45—48 return to their respective normal conditions.

The cam 58 has a front cam surface 58a identical to the surface of the cam 57 and, in addition, has two rear cam lobes 58b and 58c. The front cam surface 58a operates on a cam point 62a of a pivoted lever 62 to close and open the contact 49 to correspond with the closing and opening of the contacts 45 and 48, as indicated in the timing chart in Fig. 18. The rear cam lobe 58b is adapted to operate on a cam point 59a, shown in Fig. 5B, of a pivoted lever 59 to close the contact 50 one column space ahead of the closing of contacts 45, 48 and 49 to reopen the contact 50 as the carriage moves to the millions order print position (see the timing chart, Fig. 18). The contact 50 will be closed momentarily a second time by the cam lobe 58c when the carriage spaces to the print position immediately preceding the millions order print position of the second numeric field.

The type bar actuating mechanism is now well known in the art and will be described only briefly. Reference may be had to the hereinbefore mentioned patent application Serial Number 286,684 for a more detailed description.

Referring to Fig. 2, when any character key 20 or 21 is depressed, a key lever 64 is pivoted in a clockwise direction about a point 65 against the tension of a spring 66, and a stud 64a that is formed on the key lever 64 engages a pivoted member 68 that rocks an operating cam 69 against the power roller 34. The operating cam 69 is pivoted in a clockwise direction by the roller thereby pivoting an associated sub lever 54 in a clockwise direction and actuating the associated type bar 53. With each typing action, the carriage 36 is spaced in an equally well-known manner.

In addition to actuating a type bar 53, each of the numeric keys 20 is adapted to actuate an electrical contact. Each numeric key lever 64 carries a dog 72 that is pivoted at a point 73 at the extreme front end thereof and is adapted to engage one tooth of a six tooth cam 74. Each time a numeric key is depressed, the associated dog 72 rotates an associated cam 74 one sixth of a revolution. During the one sixth revolution another tooth of the cam 74 wipes over one blade of an electrical spring blade contact 75 and closes the contact. As the one sixth revolution is completed the contact-engaging tooth passes and releases the contact blade which then, under its own tension, returns to its normally open condition. The function of the contacts 75 will be explained in the circuit description hereinafter.

The power units 33 and the means for actuating them are now well known in the art and will be described only briefly. Reference may be had to the hereinbefore mentioned patent application Serial Number 286,684 for a more detailed description.

Referring to Figs. 2 and 3, the tabulation keys 18 are adapted, when depressed to rock a bail 76 and, through a link 77, to release an eccentric cam 78 that then moves into engagement with the power roller 34. Simultaneously the key 18 rocks a front bell crank 79 that, through an associated link 80, rocks a rear bell crank 81 and thereby raises a link 82 and an interposer 42 into the path of any one of the interposer stops 43 that has been set. It will be understood that a single bail 76 is actuated by any one of the seven tabulation keys 18 and that a single power unit T–33 is actuated by any one of the tabulation keys including the decimal tabulation key 12. The latter key derives its name from the fact that it is adapted to escape the carriage to the decimal point position of a numeric field. Each of the keys 12 and 18, through its respective bell crank 79 and link 80, actuates a separate interposer 42 thereby allowing the carriage to be tabulated selectively to various orders of a numeric field. The manner in which the carriage is escaped during typing and tabulation is too well-known to require explanation herein and reference may be had to the above cited patent application Serial No. 286,684 for further details.

In addition to tabulating the carriage 36, each of the tabulation keys 12 and 18 is adapted to actuate an electrical contact. Referring to Fig. 3, each bail 79 has a stud 84 formed thereon that is adapted to engage and close an electrical spring blade contact 85 when the bail 79 is rocked in the manner described hereinbefore. When the bail 79 is released, the contact 85 opens under tension of its own spring blades.

Referring to Fig. 4, the usual carriage return mechanism has been adapted to perform an unlatching operation in addition to its usual function. A carriage return key lever 64 is pivoted in the usual manner at the point 65 and, when the carriage return key 15 is depressed, a power unit CR–33 (Carriage Return—33) is actuated through one of the links 77. Through a line 89, the power unit CR–33 pivots a crank 90 causing a lever 91 to pivot about a point 92 and move a constantly driven clutch plate (not shown) into engagement with a drum 93. Reference may be had to the aforementioned Patent Number 1,753,450 for details of the carriage return mechanism. The drum 93 is rotated thereby winding a tape 94 and returning the carriage 36 that is attached to the other end of the tape. When the power unit CR–33 is actuated, a bell crank 96 that is suitably pivoted on the machine frame by a pin 97, is rocked through a link 98 that is connected at one end to the power unit CR–33 and at the other end to the bell crank 96. A unit comprising a lever 101, a rod 102, and a latch 103 is biased in a clockwise direction by a spring 104 and is rocked in a counterclockwise direction by the bell crank 96. It will be apparent that the counterclockwise movement of the latch 103 will cause the latter to disengage a stud 105, the purpose of which will be explained hereinafter.

Figure 6:
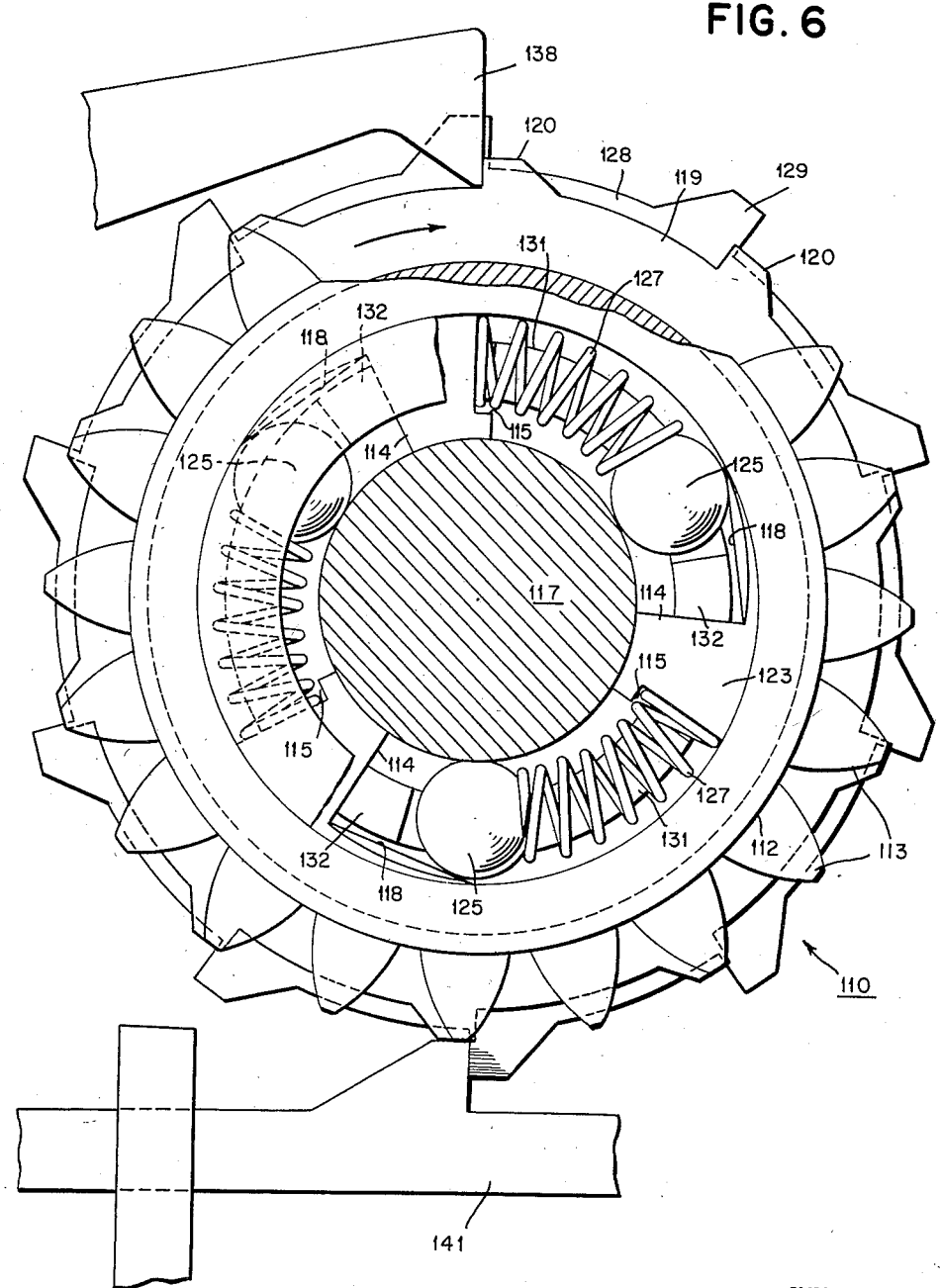
Fig. 6 is a sectional side view of a clutch.

A plurality of clutches 110 are used in the accumulator and, since all clutches are identical, only one will be described. Fig. 6 is a sectional elevation of the clutch and Fig. 7 shows a full front view of one clutch and a sectional view of an adjacent clutch. Each clutch comprises a cylindrical member 112 having twenty equally spaced teeth 113 formed on the outer surface thereof. Three equally spaced studs 114 extend inwardly from the inner surface of the cylinder 112, and each stud 114 has a lip 115. The cylinder 112 is mounted on a shaft 117, the innermost portions of the studs 114 being in sliding contact with the shaft 117. Three equally spaced inclined surfaces 118 are formed on the inner surface of the cylinder 112 adjacent the studs 114. A ring 119 having teeth 120 formed thereon is brazed to the outer surface of the cylinder 112. The number of teeth 120 varies from one to ten depending on the function of the particular clutch as will be described more fully hereinafter. A ring 123 having three equally spaced annular flange segments 124 extending laterally therefrom is inset in and brazed to the cylinder 112.

A steel ball 125 that is small enough to fit freely between the inner surface of the cylinder 112 and the shaft 117 and large enough to cause a bind between the cylinder and the shaft when positioned on one of the inclined surfaces 118 is placed between the cylinder and the shaft at the foot of each incline 118. Helical springs 127 are placed between the balls 125 and the adjacent studs 114 with the springs held away from the shaft 117 at one end by the lips 115, and at the other end by the balls 125. The springs 127 tend to force the balls 125 up the inclines 118.

A ring 128, having in each case a number of teeth 129 equal to the number of teeth 120 on that particular clutch, is rotatably mounted on segments 130 formed on the studs 114. The ring 128 has three equally spaced annular flange segments 131 similar to the flange segments 124, and three equally spaced studs 132. The ring 128 is so oriented with respect to the ring 123 and the cylinder 112 that the flange segments 124 and 131 are positioned opposite each other and each pair of segments comprising one segment 124 and one segment 131 form guide members for one of the balls 125 to prevent lateral movement thereof as shown in Fig. 7. Each stud 132 is interposed between a ball 125 and the clockwise adjacent stud 114 as viewed in Fig. 6. Retainer rings 134, split as at 135 to facilitate assembly, fit into annular grooves 136 in the shaft 117 to hold the clutches 110 against longitudinal movement on the shaft 117.

Figure 9:
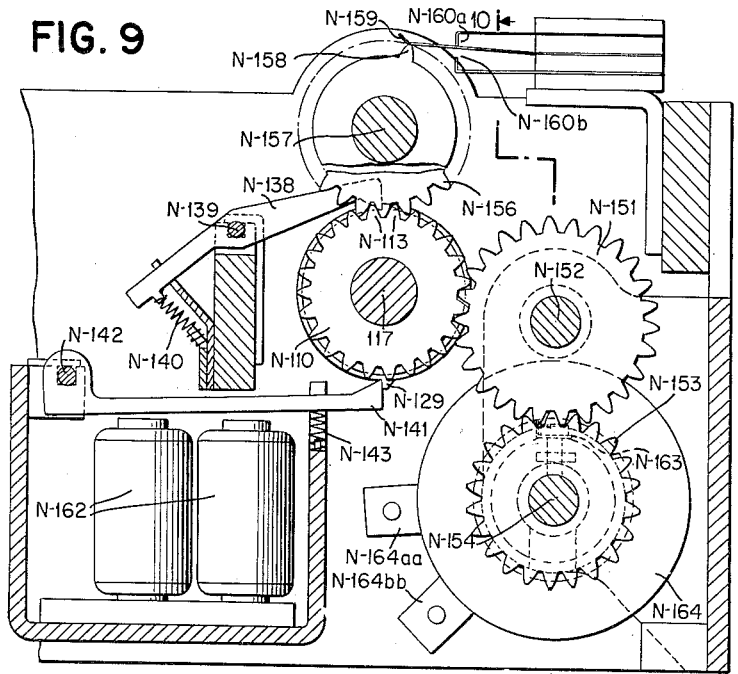
Fig. 9 is a side view of a numeric timing emitter.

A back stop member 138, that is partially shown in Fig. 6 and is shown in full in Fig. 9, is pivoted at 139 and biased clockwise by a compression spring 140. The member 138 rides over the teeth 120 as the ring 119 rotates in a clockwise direction with the cylinder 112 and drops behind each tooth 120 as it passes. An armature 141, that is partially shown in Fig. 6 and is shown in full in Fig. 9, is pivoted at 142 and is biased into engagement with the teeth 129 by a compression spring 143. In the inoperative condition of the clutch, the shaft 117 is rotating, the backstop member 138 is in engagement with a tooth 120, the armature 141 is in engagement with a tooth 129, the studs 132 hold the balls 125 off the inclined surfaces 118, the springs 127 are compressed and the cylinder 112 is stationary. To engage the clutch, the armature 141 is disengaged from the tooth 129 by means to be described hereinafter, and the ring 128 is free to rotate. The compressed springs 127 force the balls 125 in a clockwise direction thereby rotating the ring 128 with its studs 132 in a clockwise direction. As the balls 125 move up the inclined surfaces 118, binding occurs between the shaft 117 and balls. As the clockwise rotation of the shaft tends to move the balls up the inclined surfaces 118, the bind increases and the rotary movement of the shaft 117 is transferred to the cylinder 112. With the studs 132 interposed as they are between the studs 114 and the balls 125, the ring 128 is forced to rotate with the cylinder 112. The backstop member 138 rides over each tooth 120.

To disengage a clutch 110, the armature 141 is moved into engagement with a tooth 129 thereby stopping the ring 128 with its studs 132. As the cylinder 112 continues in a clockwise direction, the balls 125 come against the now stationary studs 132 and are pushed down the inclined surfaces 118 against the springs 127. The balls 125 are stopped by the studs 132 breaking the driving connection with the shaft 117, but the momentum of the cylinder 112 carries the latter a bit further thereby compressing the springs 127 and allowing the backstop member 138 to ride over another tooth 120. The momentum of the cylinder is dissipated in compressing the springs 127. The springs are actually over compressed and as they expand to their normal compressed length, they rock the cylinder 112 in a counterclockwise direction bringing a tooth 120 against the backstop member 138 thereby latching the clutch in a disengaged position.

Referring to Fig. 9, a numeric pulse emitter and contact unit that is generally designated 146 is shown. Nine such units are provided, one for each of the digits one through nine. A unit 146 is not required for the digit zero. Several other units, namely, seven tabulation pulse emitter and contact units 147, a column selector distributor 148, a column distributor spacer 149, and ten counter order units 150, are provided and are, at least in part, of similar construction. To avoid unnecessary duplication of description, a unit 146 will be described and as far as possible reference will be made thereto in the description of the units 147, 148, 149 and 150. The parts of the units 146 are given a prefix letter "N" to designate "numeric," the similar parts of the units 147 are given a prefix letter "T" to designate "tabulation," the similar parts of the unit 148 are given a prefix letter "D" to designate "distributor," the similar parts of the unit 149 are given a prefix letter "S" to designate "spacer," and the similar parts of the counter units 150 are given a prefix letter "C" to designate "counter."

Each unit 146 comprises one of the clutches N–110; a twenty tooth idler gear N–151 that is mounted on a shaft N–152 and meshes with the clutch teeth 113 of the clutch N–110; a twenty tooth emitter gear N–153 is mounted on a shaft N–154 and meshes with the idler gear N–151; a twenty tooth cam gear N–156 is mounted on a shaft N–157 and meshes with the clutch teeth 113, the hub of the gear N–156 carrying a single tooth cam N–158 that is adapted to operate a contact blade N–159 when the clutch N–110 is engaged, to open a contact N–160a and to close a contact N–160b; a backstop member N–138; an armature N–141; and a pair of armature actuating magnets N–162. Each of the clutches N–110 is provided with a single tooth N–120 (not shown in Fig. 9) and a single tooth N–129 so that each time a clutch N–110 is engaged momentarily it will make a complete revolution before the armature N–141 reengages the tooth N–129. When the clutch N–110 is engaged the gear N–156 and cam N–158 are rotated causing the contact N–160a to open and N–160b to close and, at the end of the revolution, the tooth N–158 stops in a position to hold the contact N–160a closed and the contact N–160b to open.

Figure 10:
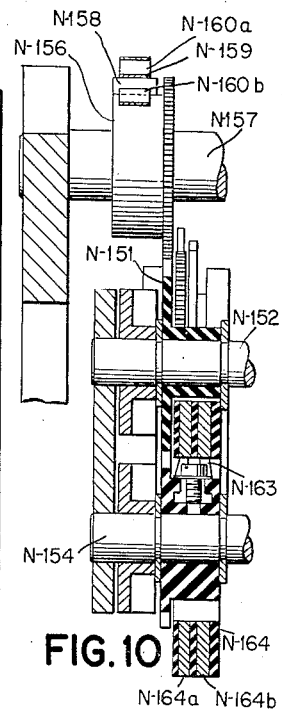
Fig. 10 is a sectional view of a numeric timing emitter taken along a line 10—10 in Fig. 9.

On the hub of the gear N–153 is mounted a contact wiper N–163 that makes one revolution for each revolution of the clutch N–110. The wiper N–163 acts on a contact ring N–164a, and a contact segment N–164b of an annular member N–164 as shown in Fig. 10. The conducting ring N–164a is in contact with the wiper N–163 at all times whereas the contact time of the second contact member N–164b varies in length from approximately 316° for the unit 146—9 representing the digit "9" to approximately 28° for the unit 146—1 representing the digit "1." Reference may be made to the timing chart of Fig. 18 for the intermediate segment lengths. The contact wipers N–163 for each of the nine units 146 rotate at the same speed and the duration of the contact through the wiper N-163 from the complete contact ring N-164a to the contact segment N-164b is dependent upon the length of the segment N-164b. An electrical connection is made to the contact ring N-164a through a terminal N-164aa shown in Fig. 9, and to the contact segment N-164b through a terminal N-164bb. The electromagnets N-162 are connected in parallel for actuating the armature N-141 in response to an electrical pulse.

Seven tabulation emitter and contact units 147 are provided, three of which are schematically represented in Fig. 16A. As in the case of the units 146, the units 147 each have a single tooth T-120 and a single tooth T-129 and therefore function in increments of complete revolutions. Each unit 147 comprises a clutch T-110, an idler gear T-151, an emitter gear T-153, a cam gear T-156, an armature T-141, a pair of electromagnets T-162 and an emitter wiper T-163. The units 146 and 147 are nearly identical, the difference being in that the contacts operated by the single tooth cam T-158 comprise only contact blades T-159 and a contact T-160b, and that, as may be seen in the timing chart of Fig. 18, the lengths of the segments T-164b vary from the length of segments N-164b, the longest contact being 258° and the shortest contact being 18°. The units 147 otherwise operate in the same manner as the units 146 and further explanation is thought to be repetitive and unnecessary. It will be noted in the timing chart that all of the segments N-164b and T-164b are contacted by their respective wipers during the last 10° of the wiper revolution and are in contact with the segments at the start of any revolution.

A column distributor spacer unit 149 is shown in Fig. 8 and has the following parts that are identical to the units 146 and 147: a clutch S-110, an idler gear S-151, an emitter gear S-153, a wiper S-163, an armature S-141, a pair of electromagnets S-162 and a backstop member S-138. The unit 149 has a single tooth S-120 and a single tooth S-129 and therefore functions in increments of complete revolutions. The unit 149 does not include a cam gear and contacts such as the cam gear N-156 and the contacts N-160a and N-160b. The contact segments S-164b is positioned between 280 and 306 degrees of the emitter wiper cycle as shown in Figs. 16A and 18. Contact is made between the contacts S-164a and S-164b after the time when the segments N-164b-1, N-164b-2, N-164b-3, N-164b-4, N-164b-5, N-164b-6, N-164b-7 and N-164b-8 have been traversed by the wiper N-163, but before the segment N-164b-9 has been traversed. The wipers N-163 and S-163 are concurrently in contact with their respective segments N-164b-9 and S-164b from 280° to 306° of the wiper cycle and both contacts are broken at 306° as shown in the timing chart, Fig. 18.

Figure 11:
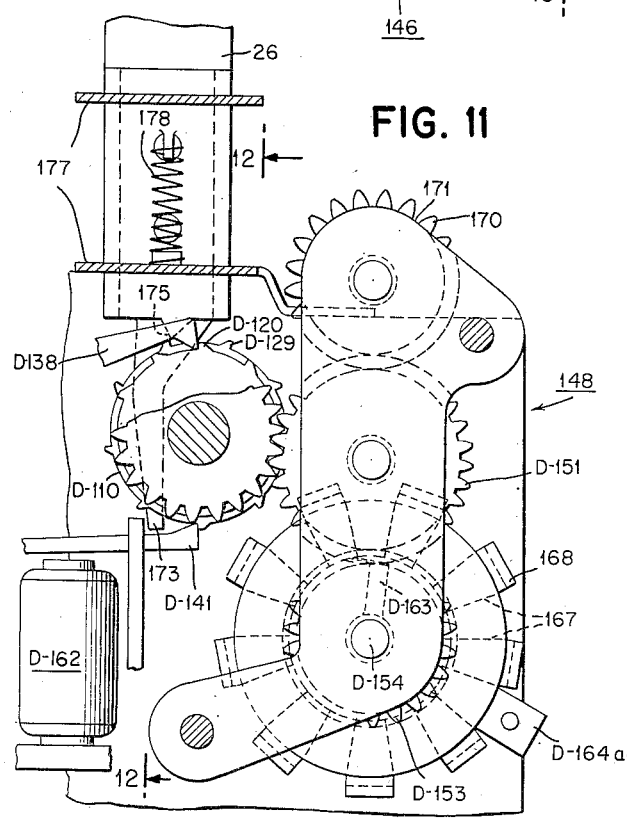
Fig. 11 is a side view of a column selector distributor taken along a line 11—11 in Fig. 13.
Figure 12:
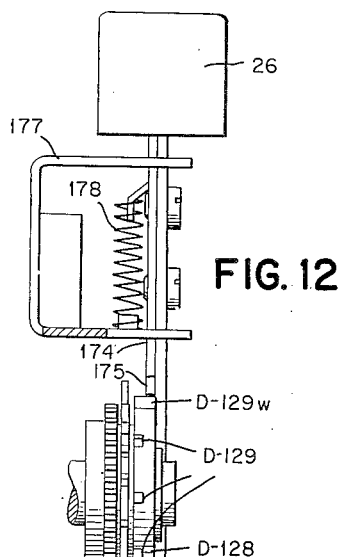
Fig. 12 is a sectional view taken along a line 12—12 in Fig. 11.

Shown in Figs. 11 and 12 is a column selector distributor that is generally designated 148 and has both electrically and manually actuated means for operating it. The column selector unit 148 includes a clutch D-110, having nine teeth D-120 and nine teeth D-129 so that the clutch need not be operated in increments of complete revolutions, but may be operated in increments of ninths of a revolution. The unit 148 also includes an idler gear D-151 that meshes with a twenty tooth gear D-153 to drive a contact wiper D-163 that contacts a conducting ring D-164a (not shown in Fig. 11) and in making a complete revolution successively contacts nine individual segments 167 that are schematically shown in Fig. 16B and are adapted for receiving electrical connections at 168. An electrical connection is made to the contact ring D-164a through a tab D-164aa.

A twenty tooth gear 170 that meshes with the idler gear D-151 carries an annular flange 171 that has nine index marks corresponding to the nine segments 167. The rotation of the flange 171 corresponds to the rotation of the wiper D-163 and gives a visual indication of the particular one of the segments 167 that is currently in contact with the wiper D-163. The clutch D-110 may be engaged by an electrical pulse to the associated electromagnets D-162 only one of which is shown in Fig. 11, which then attracts the associated armature D-141 withdrawing the latter from the tooth D-129 in the hereinbefore described manner. In the use of the accumulator it is necessary to have the wiper D-163 in contact with a segment 167 corresponding to the numeric order currently being typed and, since the tabulation emitters 147 work on a time duration basis, it is necessary that the wiper D-163 be in a home position before tabulation commences. To this end the manual key 26, shown in Figs. 1, 11 and 12, is provided. The key 26 comprises an elongated stem member 173 and a shorter stem member 174 having a tooth 175. The key 26 is slidably supported in a U-frame member 177 that is suitably mounted on the machine frame work and is biased upwardly by a spring 178. The ring D-128 of the clutch D-110 that is shown in Fig. 12 is not identical to that previously described; the ring D-128 is wider than that described hereinbefore and has eight teeth D-129 of the usual width. The ninth tooth, designated D-129W is a wide tooth. When the key 26 is manually depressed, the extension 173 engages the armature D-141 and moves the latter out of engagement with the currently engaged tooth D-129 thereby causing the clutch D-110 to be engaged in the hereinbefore described manner. Simultaneously with the action of the extension 173, the tooth 175 on the key stem 174 is moved into the path of the extended portion of the wide tooth D-129W. It will be apparent that the ring D-128 will be stopped when the wide tooth D-129W arrives at the interposed tooth 175. The backstop member D-138 drops behind a tooth D-120 causing the clutch D-110 to be disengaged after which the key 26 may be released. The wiper D-163 is then in the starting position in contact with a segment 167-M, the M designating the millions order of the numeric field. The letter "M" will appear at the top of the flange 171. The other index points on the flange 171 are "100T," "10T," "1T," "100," "10," "1," ".10," and ".01."

Figure 13:
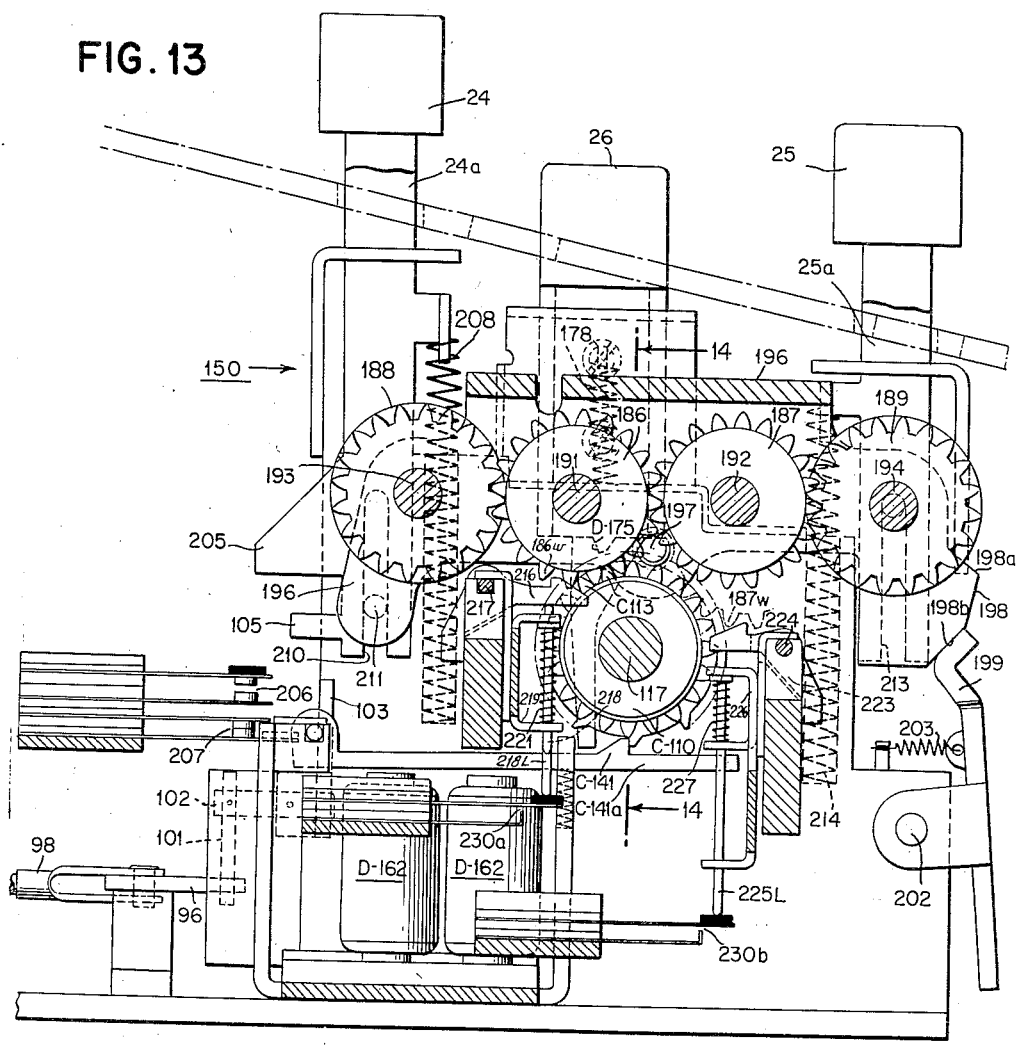
Fig. 13 is a side elevation of the counter taken along a line 13—13 in Fig. 15.

A side elevation of the counter mechanism is shown in Fig. 13 with the control keys 24, 24a, 25, 25a and 26. Each counter order, of which nine are provided, is generally designated 150 and comprises a clutch C-110, a debit gear 186, a credit gear 187, a visual indicating gear and number wheel 188 that is associated with the debit gear 186, and a visual indicating gear and number wheel 189 that is associated with the credit gear 187. The gears 186, 187, 188 and 189 are rotatably supported on respective shafts 191, 192, 193 and 194 that are supported at either end in a common frame member 196. The frame 196 is pivotally supported by a pin 197 and at the right, as viewed in Fig. 13, the frame has a detent 198 that cooperates with a latch member 199 that is pivotally mounted at 202 and is biased in a counterclockwise direction by a spring 203. The latch 199 may be engaged with either of two detent surfaces 198a and 198b and will hold the counter units 150 in the detented position until the latter is manually repositioned by depression of an appropriate control key 24 or 25.

It will be noted that in Fig. 13, the key 24a appears directly behind the key 24 and the key 25a appears directly behind the key 25. The key stems 24 and 25 have been broken off just below the key buttons to show the key stems 24a and 25a. The keys 25 and 25a are identical whereas the keys 24 and 24a are not identical. The key stem 24a carries a stud 205 adapted to close a contact 206 when the key 24a is depressed, and the key stem 24a also carries the aforementioned stud 105 that serves a dual purpose of opening a contact 207 and engaging the aforementioned latch 103, as shown in Figs. 4 and 13, that holds the key stem 24a in the depressed position until the latch 103 is released by the carriage return mechanism as hereinbefore described. When the key stem 24a is released, it is returned to its normal raised position by a spring 208. Both of the key stems 24 and 24a have open end slots 210 that engage pins 211 that are fixed in the frame member 196 so that, when either of the keys 24 or 24a is depressed, the whole frame 196 will be rocked in a counterclockwise direction about the pivot 197 and the debit gears 186 will engage the teeth C-113 of the clutches C-110 as shown in Fig. 13. The key stem 24 does not have the studs 105 and 205 and is not latched in the down position but is restored by the spring 208 as soon as the key 24 is released by the operator. The key stems 25 and 25a similarly have open end slots 213 that engage extensions of the shaft 194. The latter key stems similarly are biased upwardly by springs 214 and as soon as the keys 25 and 25a are released they are returned to their normal raised positions.

Figure 14:
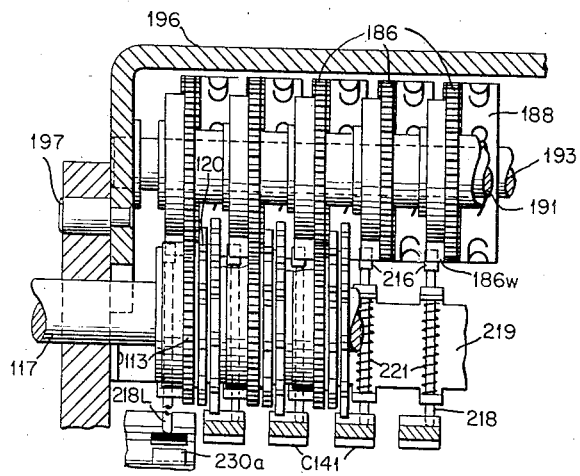
Fig. 14 is a partial sectional front view of the counter taken along a line 14—14 in Fig. 13.

Referring to Figs. 13 and 14, an arrangement for carrying from one counter order to the next higher counter order is shown. One tooth on each of the debit gears 186 is designated 186W and is of twice the width of the other teeth on the same gear and is located at a position corresponding to the "0" index. A lever 216 is pivoted at 217 and, when the lever is in its normal position, it extends into the path of the wide tooth 186W. When a gear 186 is turned from its "9" index position to its "0" index position, it is necessary that a "1" be entered into the next higher counter order. To this end, the wide tooth 186W rocks the lever 216 in a clockwise direction against a pin 218 that is supported and guided by a U-shaped frame member 219. The lower end of the pin 218 (shown in dotted outline) rests on the armature C-141 of the next higher counter order and, when the wide tooth 186W rocks the lever 216 thereby depressing the pin 218, the armature C-141 is pushed down and out of engagement with the currently engaged tooth C-129 thereby causing the clutch C-110 to be engaged as described hereinbefore. When the wide tooth 186W has passed, the lever 216 and the pin 218 are returned upwardly to their normal positions by a compression spring 221. The armature C-141 is moved upwardly by the spring C-143, to engage a tooth C-129.

Since the debit gear 186 and the credit gear 187 mesh one with the other, any digit that is added into one gear is subtracted from the other so that one counter wheel 188 or 189 indicates the true value whereas the other counter wheel indicates the complement thereof. When the gear 187 is engaged with the clutch teeth C-113, and the gear 187 turns from its "0" index position to its "9" index position, it is necessary to subtract one from the next higher counter order. In a manner similar to that described for the digit gear, a wide tooth 187W actuates a lever 223 that is pivoted at 224 to depress a pin 225 that is supported and guided in a U-shaped frame piece 226 and is biased upwardly by compression spring 227. The lower end of the pin 225 (shown in dotted outline) rests on an extension C-141a of the armature C-141 of the next higher counter order. In the manner described hereinbefore, the clutch C-110 is actuated and, due to the credit gears 187 being in mesh with the clutch teeth C-113, a "1" is subtracted from the next higher counter order.

When the highest counter order goes from "9" to "0" or from "0" to "9," it is necessary to obtain a corrective "1." The corrective "1" is handled electrically and, to this end, electrical contacts 230a and 230b are respectively associated with the highest counter order carry teeth 186W and 187W. In both cases, pins 218-L and 225-L are provided as shown in full in Figs. 13 and 14. These latter pins are identical in every respect to the pins 218 and 225 except that they are longer as indicated by the suffix "L." The pins 218L and 225L respectively actuate the contacts 230a and 230b rather than actuating armatures C-141. The function of the contacts 230a and 230b will be described in the circuit description hereinafter.

A front elevation of the accumulator is shown in Fig. 15 indicating the relative positions of the numeric units 146, the tabulation units 147, the counter units 150, the keys 24, 24a, 25, 25a and 26, the column selector distributor unit 148 and the column spacer unit 149. The two left hand emitter units 147 are shown as well as a portion of the right hand unit 147. The two left hand units 146 and the unit 149 are shown. Also shown are five of the counter units 150. The journaling of the various shafts in frame pieces is shown as well as the single shaft 117 upon which all twenty-seven clutches 110 are mounted. A pulley 231 is shown on the shaft 117 for the driving connection with the usual electric motor that drives the power roller 34.

*Circuit description*

The circuitry for the control and operation of the accumulator is shown in Figs. 16A and 16B with a schematic showing of the various clutch controlled emitters N-164, T-164, D-164 and S-164. The upper half of Fig. 16A shows three of the seven tabulation key controlled emitter units 147. The lower half of Fig. 16A shows the column selector spacer unit 149, the armature actuating magnet D-162 that is associated with the column selector distributor unit 148, and an electron tube 236 having its cathode connected to ground G. The upper half of Fig. 16B includes three of the nine numeric key controlled emitter units 146. The lower half of Fig. 16B includes the column selector emitter unit 148 and ten armature actuating magnets C-162 that are associated with the ten numeric orders of the accumulator. The ten electromagnets are designated C-129-M, C-129-100T, C-129-10T, C-129-1T, C-129-100, C-129-10, C-129-1, C-129-.10 and C-129-.01, and are associated with the respective numeric counter orders one million, on hundred thousand, ten thousand, one thousand, one hundred, ten, one, tenths, hundredths. Also shown are two control tubes 237 and 238 having their cathodes connected to ground G.

The combination typewriter-accumulator is designed for use in billing wherein itemized statements 240 such as that illustrated in Fig. 17 are prepared. The machine as described is adapted for listing the items 241 at the left of the sheet and for listing charges 242 in one column at the right and credits 243 in a second column to the right of the charge column 242. The purpose of the carriage contact 49 is to disable the numeric emitter units 146 while numeric data such as quantities or addresses are being typed on the left side of the sheet.

Assume that the first item and quantity 241 have been typed and the price $90,000.00 is to be typed in the column 242 and entered in the accumulator. The hereinafter described operations may be more readily followed by reference to Fig. 17. Since the $90,000.00 entry is the first item of the bill it is necessary to assure that the column selector wiper D-163 is resting in contact with the emitted segment 167-M before the tabulation is started. The column selector key 26 is depressed and the column selector clutch D-110 is engaged and the wiper D-163 is rotated to the starting segment 167-M in the manner described hereinbefore and is stopped thereby engagement of the key tooth 175 and the wide tooth D-129W. The symbol "M" appears in the indicator window 30 shown in Fig. 1.

The highest order of the amount $90,000.00 is the ten thousand order so the tabulation key 18-10T is depressed. In the manner described hereinbefore, the carriage is tabulated to the ten thousands order of the column 242 and the contact 85-10T is closed. As the carriage passes the position immediately to the left of the millions order position, the carriage cam 53b closes the contact 50 momentarily in the manner described hereinbefore. As the carriage reaches the millions order position, the contact 49 closes and remains closed until the carriage has traversed both numeric fields 242 and 243 or until the carriage is returned beyond the millions order position of the numeric field 242. The momentary closing of the contact 50 completes a circuit from a zero potential line 245, through the contact 50 to a line 246 that is common to one side of each of the bail operated contacts 85, through the contact 85-10T to the electromagnet T-162-10T, to a line 247 and through a line 248 to a positive potential line 249. The magnet T-162-10T attracts the armature T-141-10T thereby engaging the associated clutch T-110-10T as described hereinbefore. The cam T-158-10T and the emitter wiper T-163-10T are caused to rotate in the manner described hereinbefore. As soon as rotation commences, the contact T-160b-10T closes and the wiper T-163-10T commences wiping on the emitter segment T-164b-10T. A circuit is complete from the line 245 through a line 250, through the contact blade T-159-10T, the contact T-160b-10T, through the emitter segment T-164b-10T, through the wiper T-163-10T, the contact ring T-164a-10T, through lines 253, 254, 255 and a resistor 256 to a negative potential line 257. The current through the traced circuit raises the potential on a grid 236g of the tube 236. The tube 236 fires and completes a circuit from ground G through the armature magnet D-162 to the line 249. The magnet D-162 is energized and causes the engagement of the clutch D-110 of the column selector unit 148 as described hereinbefore. The wiper D-163 of the column selector unit 148 commences rotating. The wiper T-163-10T of the unit 147-10T is in contact with the segment T-164b-10T for approximately fifty-eight degrees of the wiper revolution and therefore the tube 236 and the magnet D-162 remains energized for a corresponding period of time. When the wiper T-163-10T breaks contact with the segment T-164b-10T at 58 degrees of the wiper revolution, the tube 236 is extinguished and the magnet D-162 is deenergized. The clutch D-110 latches up with the wiper D-163 rotated approximately fifty-eight degrees from its starting position where it rests on the segment 167-10T and completes a circuit from the line 249, through the ten thousand counter order magnet C-162-10T, through a line 260-10T, through the segment 167-10T, the wiper D-163, and a line 261 to the plate 238P of the tube 238. The wiper T-163-10T completes its revolution and latches up as described hereinbefore. The typewriter carriage is stopped in the ten thousand order position by the coaction of the tabulation interposer 42-10T and an interposer stop 43.

The first digit to be entered in the accumulator is the digit "9." The numeric key 20—9 is actuated and the digit "9" is typed in the usual manner. As the key lever 64—9 is depressed, the attached dog 72—9 actuates the associated cam wheel 74—9 and the contact 75—9. A circuit is complete from the line 245, through the contact 49, a line 263, the normally closed contacts N-160a-9, N-160a-8, N-160a-7, N-160a-6, N-160a-5, N-160a-4, N-160a-3, N-160a-2 and N-160a-1, through a line 264 to a line 265 that is common to one side of each of the numeric key operated contacts 75, through the now closed contact 75—9 and the magnet N-162-9 through a line 267 and a line 268 to the positive line 249. The magnet N-162-9 causes the clutch N-110-9 to be engaged in the usual manner thereby opening the contact N-160a-9 and closing the contact N-160b-9. It is apparent that a pulse cannot now pass from the line 263 to any of the other key contacts 75 in the event that another key should be accidentally actuated. The wiper N-163-9 commences rotating and is in contact with the segment N-164b-9 for approximately 306 degrees of the clutch revolution completing a circuit from the line 245, through the contact 49, the line 263, the contact N-160b-9, the emitter segment N-164b-9, the wiper N-163-9 to a line 270, through the now closed carriage operated contact 45 and a resistor 271 to the line 257, thereby raising the potential of grids 237g and 238g of the tubes 237 and 238 and causing both tubes to conduct. A circuit is then complete from ground G, through the tube 238 and the line 261, through the contact ring D-164a, the wiper D-163, through the segment 167-10T, the line 260-10T and the ten thousands order counter magnet C-162-10T to the positive line 249. Energizing the magnet C-162-10T causes the associate clutch C-110-10T (not shown on the wiring diagram) to be engaged, and starts the rotation of the ten thousands order debit gear 186. The duration of contact of the emitter wiper N-163-9 on the segment N-164b-9 is sufficient to hold the tube 238 in a conducting state for a period of time required for nine tenths of a revolution of the ten thousands position clutch C-110-10T. Therefore, the armature C-141-10T releases one tooth 129 and engages the ninth tooth thereafter. The number wheel 188 rotates nine tenths of a revolution moving a zero from the view window 30 and exposing a "9." As described hereinbefore, the digit "9," through the gears 186 and 187 is subtracted from the number wheel 189. Initially the credit window 29 shows all "9's." When the debit window ten thousand order turns from "0" to "9," the corresponding credit window order turns from "9" to "0" to show the nines complement of the amount in the debit window. The clutch N-110-9 completes the initiated revolution and latches up returning the contacts N-160a-9 and N-160b-9 to their normal positions.

Simultaneously with the firing of the tube 238, the tube 237 fires as described hereinbefore. A circuit is complete from ground G, through the tube 237, a line 273 and the electromagnet S-162 that is associated with the column selector spacer 149, to the positive line 249. Energizing the magnet S-162 causes the clutch S-110 to engage and the wiper S-163 to commence rotating. The emitter S-164 has a single segment S-164b that is contacted by the wiper S-163 between 280 degrees and 306 degrees of the wiper revolution. At the time that contact is made with the segment S-164b, the wiper N-163-9 is still in contact with the associated segment N-164b-9. The wipers S-163 and N-163-9 break contact with their associated segments 164b simultaneously. While contact is made between the wiper S-163 and the segment S-164b, a circuit is complete from the line 245 through a line 275, the segment S-164b, the wiper S-163, the contact ring S-164a, and a line 276 to the line 255 and then to the negative potential line 257 through the resistor 256, thereby raising the potential of the grid 236g of the tube 236 and causing the tube to conduct as described hereinbefore to energize the electromagnet D-162. The segment S-164b provides a contact of a duration sufficient to hold the magnet D-162 energized while the column selector wiper D-163 spaces one step around the emitter D-164 to the one thousand (1T) order contact 167-1T. The carriage spaces to the following column in the usual manner after the typewriter key is actuated.

The next digit to be typed and accumulated is a zero. The zero key 20—0 is actuated and the zero is typed on the sheet 240 in the one thousand order position adjacent the previously typed digit "9." The key lever 64—0 causes the closing of the contact 75—0 that completes a circuit from the line 245, through the contact 49, the line 263, the contacts N-160a-9, N-160a-8, N-160a-7, N-160a-6, N-160a-5, N-160a-4, N-160a-3, N-160a-2, N-160a-1, the lines 264 and 265, through the contact 75—0, the line 279, the line 273 and the magnet S-162 to the positive line 249. A revolution of the column selector spacer wiper S-163 is initiated which in turn causes a one step advance of the column selector wiper D-163 to the one hundred order segment 167—100 in the manner described hereinbefore. When a zero is typed, the accumulated amount in the counter is not changed and therefore it is not necessary to have a numeric emitter unit 146 associated with the zero digit key 20—0. The comma is typed next to be followed by three zeros a decimal and then two more zeros. The comma key and the decimal key do not have contacts 75 and therefore have no effect on the accumulator. Each time a digit is typed the column selector wiper D-163 is advanced so that after the hundredths order digit zero is typed, the wiper D-163 advances to the starting point or millions order segment 167-M. All other digits "1" through "8" are accumulated in the same manner as described for the digit "9." As the carriage is returned beyond the millions order position, the cam operated contacts 46 and 47 close and the contacts 45 and 48 open, as does the contact 49. The contact 50 is closed momentarily without having any effect.

Assume that a credit of $8,000.00 is to be recorded on the next line in the column 243. The credit key 25 is depressed and the counter frame 196 is rocked to move the gears 186 out of mesh with the counter clutch teeth C-113 and the gears 187 into mesh therewith. With the gears 186 and 187 so positioned, subsequently typed values will reduce the complement amount accumulated in the credit counter wheels 189 and will reduce the true amount accumulated in the debit counter wheels 188. The tabulation key 18-1T is depressed twice to escape the carriage to the one thousand order position in the numeric field 243. The contact 50 closes momentarily as the carriage passes the column immediately to the left of the millions order position of the numeric field 242 initiating a cycle of the wiper T-163-1T. It is necessary that the column selector distributor 148 be reset to the starting position before the key 18-1T is depressed the second time. As the carriage passes the column immediately to the left of the millions order position of the numeric field 243, the wiper T-163-1T starts a second revolution and comes to rest on the segment 167-1T. The numeric keys 20 are then operated in the proper order and the typed value $8,000.00 is accumulated as described for the numeric field 242.

Assume that before any further debits are entered, another credit of $83,553.12 is to be entered. It is apparent that such a credit will leave a credit balance of $1,553.12. The tab key 18-10T is depressed twice as described for the first credit entry to position the carriage in the ten thousands order position of the column 243 and to position the wiper D-163 on the segment 167-10T after which the amount $83,553.12 is typed. The debit counter reading changes from 0,082,000.00 to 9,998,446.88 indicating that a credit balance exists. The credit counter reading changes from 9,917,999.99 to 0,001,553.11 also indicating that a credit balance exists. The credit balance is not $1,553.11, but rather is $1,553.12. It is necessary to have a carry around pulse to add a "1" in the lowest counter order to give a correct true figure in the credit counter and the "9's" complement thereof in the debit counter. To this end, the plunger operated contact 230b is positioned at the millions order counter 150 to be actuated when the counters gear 187 are in mesh with the counter clutch teeth C-113 and the credit counter millions order wheel 187-M turns from "9" to "0" to indicate a credit balance. The operation of the contact 230b is explained hereinbefore in the counter description. When the contact 230b is closed, a circuit is complete from the line 245, through a line 281, through the contact 230b and a relay coil 282 to the line 249. The relay 282 is energized and closes its point 282-1 thereby completing a circuit from the line 245, through the line 281, the contact 282-1, the contact 207 and the counter magnet C-162-.01 to the line 249. The magnet C-162-.01 is energized momentarily to enter a "1" in the hundredths position of the counter to change the readings of the credit counter to a correct true value of 0,001,553.12 and the debit counter reading to the nines complement thereof of 9,998,446.87.

Similarly, when a debit value is entered that changes the indicated totals from a credit balance to a debit balance, the counter gears 186 are in mesh with the counter clutch teeth C-113, and the millions order carry tooth 186W-M effects a momentary closing of the plunger operated contact 230a that in turn causes the relay 282 to be energized and a "1" to be counted into the lowest order counter as described with respect to the contact 230b to give a correct true reading in the debit counter and the nines complement thereof in the credit counter.

When all debit and credit items have been listed on a bill and the amounts have been accumulated, it is desired to type the balance, whether that balance is a credit or a debit balance, and by the act of typing the balance, to clear the debit counter to show all zeros and the credit counter to show all nines.

Assume that a debit balance of $8,700.13 stands in the debit counter, and the nines complement thereof in the credit counter. The respective counter readings are 0,008,700.13 and 9,991,299.86. To clear the counters, first the debit total key 25a is depressed to rock the credit counter gears 187 into mesh with the counter clutch teeth C-113. The debit counter wheels 188 appear adjacent the window 28. The tabulation key 18-1T is depressed to position the carriage at the one thousand order position in the numeric field 242 and to set the column selector wiper D-163 on the segment 167-1T. The number 8,700.13 is typed and the debit counter wheels 188 clear to show all zeros and the credit counter wheels 189 clear to show all nines. It will be noted that in clearing a debit total a corrective "1" is not required.

When a credit balance stands in the counters, special circuitry including the carriage-operated contacts 45, 46, 47 and 48 and the contacts 206 and 207 that are operated by the credit total key 24a is required for clearing the debit counter to show all zeros and the credit counter to show all nines. Assume that the debit counter reads 9,991,299.86 and the credit counter reads 0,008,700.13 thus indicating a credit total of $8,700.13. The credit total key 24a is depressed to rock the debit counter gears 186 into mesh with the counter clutch teeth C-113 and the credit counter wheels 189 appear in the credit counter window 29. When the key 24a is depressed, in addition to rocking the counter gears 186 and 187, the key studs 105 and 205 respectively open the contact 207 and close the contact 206 as described hereinbefore. The spring biased latch 103 engages the stud 105 and holds the key 24a in the depressed position. The tabulation key 18-1T is depressed twice to position the carriage in the credit field 243 as described hereinbefore and to set the column selector wiper D-163 on the segment 167-1T. The number 8,700.13 that appears in the credit counter window 29 is typed and the credit counter clears to read 0,000,000.00 whereas the debit counter clears to read 9,999,999.99. It is desired that the credit counter show all nines and the debit counter show all zeros. As the carriage spaces after typing in the units cents position, the carriage operated contacts 45 and 48 open (see Fig. 18) and simultaneously therewith, the carriage operated contacts 46 and 47 close. The carriage contact 49 remains closed for one column of space after the contacts 45, 46, 47 and 48 return to their normal conditions. A circuit is complete from the line 245, through the contact 49, a line 284, the now closed contact 206, the contact 46, and through the armature magnet N-162-1 and the parallel connected space bar solenoid 22a, through the line 268 to the positive potential line 249. The unit N-146-1 is actuated thereby causing the firing of the tube 238 in the manner described hereinbefore, and the completion of a circuit from ground G, through the tube 238, the line 261, the contact segment D-164a, wiper D-163, the segment 167-M to which the wiper D-163 advanced after typing in the units cents position, through a line 260-M, a line 285, the contact 47 and the units cents counter magnet C-162-.01 to the line 249. The magnet C-162-.01 actuates the associated counter unit 150 to add a "1" into the units cents counter wheel 188. The units cents counter wheel goes from nine to zero and the resultant wide tooth carry continues through the ascending orders until all debit counter wheels 188 stand at zero. Through the gears 186 and 187, the credit counter wheels 189 are turned from zero to nine. The contact 230a is actuated as usual as the millions order counter gear 186 turns from nine to zero, but the carry around pulse to the units cents order magnet C–162.01 through the contacts 230a, 282—1 and 207 is not received because the contact 207, due to the latching of the credit total key 24a is open. The pulse through the emitter contact 167–M does not actuate the counter magnet C–162–M because the contact 48 is open. The column selector wiper D–163 does not advance because the contact 45 is open and the tube 237 that actuates the column selector spacer magnet S–162 is not fired.

The pulse through the space bar solenoid 22a causes the carriage to space thereby causing the contact 49 to open. The carriage return key 15 is depressed causing the carriage to return and the key 24a to unlatch as described hereinbefore thereby opening the contacts 206 and 207.

The machine is ready for the preparations of the next statement.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A unitary typewriter and accumulator combination having a constantly rotated power actuator; a letter spacing carriage; a set of digit type members; means for actuating said type members selectively; a plurality of denominational indicators; denominational drivers for said indicators engageable with said power actuator; means for engaging said drivers and said indicators for rotating said indicators additively in one direction; means for engaging said drivers and said indicators for rotating said indicators subtractively in an opposite direction; a plurality of parallel connected digital control means operable by respective ones of said digit type member actuating means for engaging said denominational drivers with said power actuator for differential periods of time according to the digit values of said type member operating means; and means for switching said digital control means serially to said denominational drivers.

2. A unitary typewriter and accumulator combination having a constantly rotated power actuator, a letter spacing carriage, a set of digit type members, digit keys for actuating said type members selectively, a plurality of denominational indicators, denominational drivers for said indicators engageable with said power actuator, means for conditioning said indicators for receiving amounts selectively either additively or subtractively, a plurality of denominational tabulation keys each operable for spacing said carriage to a corresponding denominational order of a numeric field, a plurality of parallel connected digital control means operable by corresponding ones of said digit keys for engaging said denominational drivers with said power actuator for differential periods of time proportional to the digit values of said keys, switch means comprising a plurality of denominational contacts for connecting corresponding denominational drivers with said digit control means, a plurality of parallel connected denominational control means operable by corresponding said denominational tabulation keys for differential periods of time proportional to said denominational values for setting said switch means corresponding to said carriage spacing, and means for advancing said switch means successive denominational drivers each time a said digit key is operated.

3. A unitary typewriter and accumulator combination having a constantly rotated power actuator, a letter spacing carriage, a set of digit type members, means for actuating said type members selectively, a plurality of denominational indicators, denominational drivers for said indicators engageable with said power actuator, means for conditioning said indicators for receiving amounts selectively either additively or subtractively, a plurality of parallel connected digital control means operable by respective ones of said digit type member actuating means for engaging said denominational drivers with said power actuator for differential periods of time according to the digit values of said type member operating means, means for switching said digital control means serially to said denominational drivers, means for entering a one count in a next higher said indicator when the count in any one of said indicators changes from nine to zero in additive accumulation, and for subtracting a one count from said next higher said indicator when any indicator count changes from zero to nine in subtractive accumulation, means operable when an indicated negative total is entered additively clearing said accumulator to indicate the nines complement of zero, for effecting the entry of corrective one count in the lowest of said denominational indicators for changing said nines complement of zero to a true zero indication, said means comprising latchable means operable at the start of an accumulator clearing operation for conditioning other means, said other means being effective when operated for actuating one of said digital control means for effecting the entry of said corrective one count in said lowest denominational indicator, means for operating said other means after said negative total has been additively entered for disabling said means operable in response to said highest denominational indicator changing from nine to zero thereby inhibiting the erroneous entry of a one count in said lowest denominational indicator, means operable concurrently with last said digital control means for enabling said disabled means and for unlatching said latchable means.

4. The typewriter and accumulator combination of claim 3 wherein said means for operating said other means comprises said carriage, a plurality of carriage operated contacts and an actuating circuit for last said digital control means.

5. The typewriter and accumulator combination of claim 4 having means operable by said carriage for disabling said means for switching said digital control means serially to said denominational drivers after entry of said corrective one count.

6. A unitary typewriter and accumulator combination having a constantly rotated power roller; a letter-spacing carriage; a set of digit type members; individual actuating mechanisms for said digit type members; a plurality of denominational totalizer wheels; denominational drivers for said totalizer wheels selectively engageable with said power roller; a plurality of parallel connected digital contacts; a plurality of electrically actuated digital contact wipers operable concurrently with corresponding ones of said digit type members for actuating said drivers for differential periods of time according to the digit values of the actuated ones of said type members for entering said digit values in said totalizer wheels; an electrically actuated distributor for serially connecting said denominational drivers with said digital contact wipers; a carriage tabulation mechanism; a plurality of selectively operable denominational tabulation members; a plurality of parallel connected denominational contacts of differential durations; a plurality of electrically actuated denominational contact wipers operable concurrently with corresponding ones of said denominational tabulation members for initially connecting said distributor selectively with any one of said denominational drivers; and an electrically actuated distributor spacer for advancing said distributor after each entry in said accumulator.

7. A unit counter having a rotatable power actuator; means for rotating said power actuator constantly; a plurality of digital members; a count indicator; means operable for engaging said count indicator for advancement selectively either additively of subtractively; driving means for said count indicator engageable with said power actuator; an electromagnet operable for engaging said driving means; control means operable by said digital members for energizing said electromagnet for differential periods of time according to the one of said digital members actuated for entering digital values selectively in said count indicator, said control means comprising a plurality of parallel connected switch contacts one for each said digital member, engageable selectively with said power actuator for differential periods of time proportional to the digit value of respective said digital member.

8. A multiple order counter having a rotatable power actuator, means for rotating said power actuator constantly, a plurality of digital members, a plurality of denominational counter orders, means operable for engaging said counter orders for advancement selectively either additively or subtractively, denominational drivers for said counter orders engageable with said power actuator, control means operable by said digital members for engaging said driving means with said power actuator for differential periods of time according to the one of said digital members actuated, for entering selected digital values in said denominational counter orders, said control means comprising denominational switch contacts, rotary means for serially contacting said switch contacts, a plurality of denominational actuators operative for differential periods of time for initially setting said rotary means to a selected said switch contact, a plurality of denominational means for actuating said denominational actuators and means operable for advancing said denominational switch means each time a digit is entered in said counter order.

9. A multiple order counter having a rotatable power actuator, means for rotating said power actuator constantly, a plurality of digital members, a plurality of denominational counter orders, means operable for engaging said counter orders for advancement selectively either additively or subtractively, denominational drivers for said counter orders engageable with said power actuator, control means operable by said digital members for engaging said driving means with said power actuator for differential periods of time according to the one of said digital members actuated, for entering selected digital values in said denominational counter orders, said control means comprising denominational switch means, a plurality of parallel connected contacts of differential time durations selectively engageable according to the one of said digital members actuated for entering selected digits into said counter orders, means for effecting a carry from any counter order to the next higher order when said any order changes from nine to zero in additive counting, and for effecting a borrow from any counter order when the next lower order changes from zero to nine in subtractive counting.

10. A multiple order counter having a rotatable power actuator means for rotating said power actuator constantly, a plurality of digital members, a plurality of denominational counter orders, means operable for engaging said counter orders for advancement selectively either additively or subtractively, denominational drivers for said counter orders engageable with said power actuator, control means operable by said digital members for engaging said driving means with said power actuator for differential periods of time according to the one of said digital members actuated, for entering selected digital values in said denominational counter orders, said control means comprising denominational switch means, a plurality of parallel connected contacts of differential time durations selectively engageable according to the one of said digital members actuated for entering selected digits into said counter orders, means operable by the highest said counter order, when the latter changes from nine to zero in changing from a negative total to a positive total for actuating the lowest said counter order driver for effecting the entry of a one count for converting the nines complement of the positive total, through successive carries, to a true positive total.

11. A multiple order counter having a rotatable power actuator, means for rotating said power actuator constantly, a plurality of digital members, a plurality of denominational counter orders, denominational drivers for said counter orders engageable with said power actuator, means engageable with said drivers and said counter orders for rotating said orders additively in one direction, means engageable with said drivers and said counter orders for rotating said orders selectively in an opposite direction, control means operable by said digital members for engaging said driving means with said power actuator for differential periods of time according to the one of said digital members actuated, for entering selected digital values in said denominational counter orders, said control means comprising denominational switch means, a plurality of denominational actuators operative for differential periods of time for initially setting said denominational switch means to a selected said counter order, a plurality of denominational means for actuating said denominational actuators, a plurality of parallel connected contacts of differential time durations selectively engageable according to the one of said digital members actuated for entering selected digits into said selected counter order and means operable for advancing said denominational switch means each time a digit is entered in said counter order.

References Cited in the file of this patent

UNITED STATES PATENTS

| | | |
|---|---|---|
| 2,157,053 | Crumrine | May 7, 1939 |
| 2,394,637 | Schneider | Feb. 12, 1946 |